United States Patent
Sampath et al.

(10) Patent No.: US 9,831,983 B2
(45) Date of Patent: *Nov. 28, 2017

(54) SYSTEMS, METHODS AND APPARATUS FOR DETERMINING CONTROL FIELD AND MODULATION CODING SCHEME INFORMATION

(75) Inventors: Hemanth Sampath, San Diego, CA (US); Simone Merlin, San Diego, CA (US); Maarten Menzo Wentink, Naarden (NL); Santosh Paul Abraham, San Diego, CA (US)

(73) Assignee: QUALCOMM Incorporated

( * ) Notice: Subject to any disclaimer, the term of this patent is extended or adjusted under 35 U.S.C. 154(b) by 728 days.

This patent is subject to a terminal disclaimer.

(21) Appl. No.: 13/247,100

(22) Filed: Sep. 28, 2011

(65) Prior Publication Data
US 2012/0250796 A1     Oct. 4, 2012

Related U.S. Application Data

(60) Provisional application No. 61/387,542, filed on Sep. 29, 2010, provisional application No. 61/389,495, filed on Oct. 4, 2010, provisional application No. 61/405,283, filed on Oct. 21, 2010, provisional application No. 61/422,098, filed on Dec. 10, 2010, provisional application No. 61/432,115, filed on Jan. 12, 2011, provisional application No. 61/405,194, filed on Oct. 20, 2010, provisional application No. 61/409,645, filed on Nov. 3, 2010, provisional application No. 61/414,651, filed on Nov. 17, 2010.

(51) Int. Cl.
*H04L 27/00*     (2006.01)
*H04L 1/00*     (2006.01)
*H04L 5/00*     (2006.01)

(52) U.S. Cl.
CPC .......... *H04L 1/0025* (2013.01); *H04L 1/0028* (2013.01); *H04L 1/0039* (2013.01); *H04L 5/0007* (2013.01); *H04L 1/0003* (2013.01); *H04L 1/0009* (2013.01); *H04L 1/0031* (2013.01)

(58) Field of Classification Search
CPC .......................... H04L 1/0039; H04L 5/0007
USPC ........ 370/466, 310, 267, 441, 338, 476, 328
See application file for complete search history.

(56) References Cited

U.S. PATENT DOCUMENTS

| | | |
|---|---|---|
| 4,519,068 A | 5/1985 | Krebs et al. |
| 6,674,738 B1 | 1/2004 | Yildiz et al. |
| 6,771,706 B2 | 8/2004 | Ling et al. |

(Continued)

FOREIGN PATENT DOCUMENTS

| | | |
|---|---|---|
| CN | 1665317 A | 9/2005 |
| CN | 1833415 A | 9/2006 |

(Continued)

OTHER PUBLICATIONS

Stephens, et al., "IEEE P802.11 Wireless LANs; Joint Proposal: High throughput extension to the 802.11; Standard: MAC", IEEE 802.11-05/1095r4, Jan. 2006 (Jan. 2006), pp. 1-103.

(Continued)

*Primary Examiner* — Parth Patel
(74) *Attorney, Agent, or Firm* — Patterson & Sheridan, LLP

(57) ABSTRACT

Systems, method and apparatus of managing wireless communication are described herein.

35 Claims, 17 Drawing Sheets

(56) References Cited

U.S. PATENT DOCUMENTS

| | | | |
|---|---|---|---|
| 7,006,848 B2 | 2/2006 | Ling et al. | |
| 7,023,880 B2* | 4/2006 | El-Maleh et al. | 370/466 |
| 7,224,704 B2 | 5/2007 | Lu et al. | |
| 7,295,513 B2 | 11/2007 | Elliott et al. | |
| 7,411,929 B2 | 8/2008 | Ling et al. | |
| 7,590,182 B2 | 9/2009 | Ling et al. | |
| 7,593,347 B2 | 9/2009 | Maltsev et al. | |
| 7,949,060 B2 | 5/2011 | Ling et al. | |
| 8,189,619 B2 | 5/2012 | Trainin | |
| 8,611,288 B1 | 12/2013 | Zhang et al. | |
| 2003/0169769 A1 | 9/2003 | Ho et al. | |
| 2004/0147223 A1* | 7/2004 | Cho | 455/41.2 |
| 2005/0138199 A1 | 6/2005 | Li et al. | |
| 2006/0034247 A1 | 2/2006 | Gu et al. | |
| 2006/0111129 A1 | 5/2006 | Ihm et al. | |
| 2006/0227733 A1* | 10/2006 | Frederiks et al. | 370/310 |
| 2006/0248429 A1 | 11/2006 | Grandhi et al. | |
| 2006/0268819 A1 | 11/2006 | Chen et al. | |
| 2006/0291544 A1 | 12/2006 | Fischer et al. | |
| 2007/0097945 A1* | 5/2007 | Wang et al. | 370/349 |
| 2007/0129018 A1 | 6/2007 | Trainin et al. | |
| 2007/0165736 A1* | 7/2007 | Wang et al. | 375/267 |
| 2007/0195811 A1* | 8/2007 | Basson et al. | 370/441 |
| 2007/0298742 A1 | 12/2007 | Ketchum et al. | |
| 2008/0130538 A1 | 6/2008 | Raissinia et al. | |
| 2008/0219373 A1 | 9/2008 | Zhang et al. | |
| 2008/0267133 A1 | 10/2008 | Shida et al. | |
| 2008/0267190 A1 | 10/2008 | Baker et al. | |
| 2008/0316981 A1* | 12/2008 | Trainin | 370/338 |
| 2009/0013081 A1 | 1/2009 | Laroia et al. | |
| 2009/0031185 A1 | 1/2009 | Xhafa et al. | |
| 2009/0070649 A1 | 3/2009 | Aldana et al. | |
| 2009/0086690 A1 | 4/2009 | Gu et al. | |
| 2009/0143029 A1 | 6/2009 | Matsumoto et al. | |
| 2009/0175297 A1* | 7/2009 | Prakash | 370/476 |
| 2009/0185608 A1 | 7/2009 | Blackwell | |
| 2009/0207765 A1 | 8/2009 | Yamaura | |
| 2009/0207954 A1 | 8/2009 | Dai et al. | |
| 2009/0238121 A1 | 9/2009 | Kotecha | |
| 2009/0290563 A1 | 11/2009 | Gu et al. | |
| 2009/0305715 A1 | 12/2009 | Barve et al. | |
| 2010/0056171 A1 | 3/2010 | Ramprashad et al. | |
| 2010/0080173 A1* | 4/2010 | Takagi | 370/328 |
| 2010/0091675 A1 | 4/2010 | Sawai | |
| 2010/0093287 A1 | 4/2010 | Higuchi et al. | |
| 2010/0107042 A1 | 4/2010 | Sawai et al. | |
| 2010/0118797 A1 | 5/2010 | Park et al. | |
| 2010/0128669 A1 | 5/2010 | Chun et al. | |
| 2010/0202306 A1 | 8/2010 | Jersenius et al. | |
| 2010/0215112 A1 | 8/2010 | Tsai et al. | |
| 2010/0226269 A1 | 9/2010 | Chakraborty et al. | |
| 2010/0238984 A1 | 9/2010 | Sayana et al. | |
| 2010/0248635 A1 | 9/2010 | Zhang et al. | |
| 2010/0260060 A1 | 10/2010 | Abraham et al. | |
| 2010/0260138 A1 | 10/2010 | Liu et al. | |
| 2010/0284393 A1 | 11/2010 | Abraham et al. | |
| 2010/0290544 A1 | 11/2010 | Kawamura et al. | |
| 2010/0315953 A1 | 12/2010 | Pare, Jr. et al. | |
| 2010/0322165 A1 | 12/2010 | Yoo | |
| 2010/0322166 A1 | 12/2010 | Sampath et al. | |
| 2010/0322337 A1 | 12/2010 | Ylitalo et al. | |
| 2010/0329220 A1 | 12/2010 | Kim et al. | |
| 2010/0330995 A1 | 12/2010 | Aoyama et al. | |
| 2011/0002290 A1 | 1/2011 | Kim et al. | |
| 2011/0013547 A1 | 1/2011 | Liao et al. | |
| 2011/0039535 A1 | 2/2011 | Baker et al. | |
| 2011/0051705 A1 | 3/2011 | Jones, IV et al. | |
| 2011/0064146 A1 | 3/2011 | Chen et al. | |
| 2011/0069629 A1 | 3/2011 | Breit et al. | |
| 2011/0075607 A1 | 3/2011 | Kim et al. | |
| 2011/0096685 A1 | 4/2011 | Lee et al. | |
| 2011/0103280 A1 | 5/2011 | Liu et al. | |
| 2011/0110349 A1 | 5/2011 | Grandhi | |
| 2011/0110451 A1 | 5/2011 | Tsai et al. | |
| 2011/0116487 A1* | 5/2011 | Grandhi | 370/338 |
| 2011/0116488 A1 | 5/2011 | Grandhi | |
| 2011/0149760 A1 | 6/2011 | Shrivastava et al. | |
| 2011/0149927 A1 | 6/2011 | Stacey et al. | |
| 2011/0150004 A1 | 6/2011 | Denteneer et al. | |
| 2011/0164489 A1 | 7/2011 | Papasakellariou et al. | |
| 2011/0176439 A1 | 7/2011 | Mondal et al. | |
| 2011/0194650 A1 | 8/2011 | Lee et al. | |
| 2011/0199946 A1 | 8/2011 | Breit et al. | |
| 2011/0206156 A1 | 8/2011 | Lee et al. | |
| 2011/0235743 A1 | 9/2011 | Lee et al. | |
| 2011/0249578 A1 | 10/2011 | Nayeb Nazar et al. | |
| 2011/0249582 A1 | 10/2011 | Choi et al. | |
| 2011/0268088 A1 | 11/2011 | Lindskog et al. | |
| 2011/0273977 A1 | 11/2011 | Shapira et al. | |
| 2011/0274003 A1 | 11/2011 | Pare, Jr. et al. | |
| 2012/0002740 A1 | 1/2012 | Han et al. | |
| 2012/0026909 A1 | 2/2012 | Seok | |
| 2012/0026991 A1 | 2/2012 | Niu et al. | |
| 2012/0027111 A1 | 2/2012 | Vook et al. | |
| 2012/0044844 A1 | 2/2012 | Trainin | |
| 2012/0051246 A1 | 3/2012 | Zhang et al. | |
| 2012/0063439 A1 | 3/2012 | Seok | |
| 2012/0076179 A1 | 3/2012 | Stacey et al. | |
| 2012/0106531 A1 | 5/2012 | Seok et al. | |
| 2012/0127948 A1 | 5/2012 | Chung et al. | |
| 2012/0182944 A1 | 7/2012 | Sorrentino et al. | |
| 2012/0189077 A1 | 7/2012 | Seo et al. | |
| 2012/0201207 A1 | 8/2012 | Liu et al. | |
| 2012/0213310 A1 | 8/2012 | Ko et al. | |
| 2012/0243485 A1 | 9/2012 | Merlin et al. | |
| 2012/0243497 A1 | 9/2012 | Chung et al. | |
| 2012/0250541 A1 | 10/2012 | Ko et al. | |
| 2012/0250543 A1 | 10/2012 | Abraham et al. | |
| 2012/0250618 A1 | 10/2012 | Abraham et al. | |
| 2012/0250668 A1* | 10/2012 | Sampath et al. | 370/338 |
| 2012/0257567 A1 | 10/2012 | Abraham et al. | |
| 2012/0257605 A1 | 10/2012 | Abraham et al. | |
| 2012/0257606 A1 | 10/2012 | Sampath et al. | |
| 2012/0263116 A1 | 10/2012 | Basson et al. | |
| 2012/0275446 A1 | 11/2012 | Stacey et al. | |
| 2012/0315859 A1 | 12/2012 | Lee et al. | |
| 2012/0320782 A1 | 12/2012 | Seo et al. | |
| 2013/0010844 A1 | 1/2013 | Amini et al. | |
| 2013/0142134 A1 | 6/2013 | Zhu et al. | |
| 2013/0188630 A1 | 7/2013 | Song et al. | |
| 2013/0250903 A1 | 9/2013 | Ahn et al. | |
| 2013/0258986 A1 | 10/2013 | Seo et al. | |
| 2013/0260779 A1 | 10/2013 | Sohn et al. | |
| 2013/0279363 A1 | 10/2013 | Huang et al. | |
| 2013/0286925 A1 | 10/2013 | Fischer et al. | |
| 2014/0016626 A1 | 1/2014 | Dai et al. | |
| 2014/0112406 A1 | 4/2014 | Zhu et al. | |
| 2014/0369302 A1 | 12/2014 | Abraham et al. | |
| 2015/0009899 A1 | 1/2015 | Abraham et al. | |

FOREIGN PATENT DOCUMENTS

| | | | |
|---|---|---|---|
| CN | 101273543 A | 9/2008 | |
| CN | 101657985 A | 2/2010 | |
| CN | 101796880 A | 8/2010 | |
| CN | 101841356 A | 9/2010 | |
| EP | 1594284 A2 | 11/2005 | |
| EP | 1610522 A1 | 12/2005 | |
| EP | 2129155 A1 | 12/2009 | |
| EP | 2242303 A2 | 10/2010 | |
| GB | 2405052 * | 2/2005 | H04L 12/56 |
| GB | 2405052 A | 2/2005 | |
| JP | H10334615 A | 12/1998 | |
| JP | 2005323372 A | 11/2005 | |
| JP | 2007534195 A | 11/2007 | |
| JP | 2008092380 A | 4/2008 | |
| JP | 2008236431 A | 10/2008 | |
| JP | 2008252867 A | 10/2008 | |
| JP | 2009118003 A | 5/2009 | |
| JP | 2009519617 A | 5/2009 | |
| JP | 2009529292 A | 8/2009 | |
| JP | 2010041596 A | 2/2010 | |
| JP | 2010081360 A | 4/2010 | |
| JP | 2010093489 A | 4/2010 | |

(56) References Cited

FOREIGN PATENT DOCUMENTS

| | | |
|---|---|---|
| JP | 2010093704 A | 4/2010 |
| JP | 2010109401 A | 5/2010 |
| JP | 2010529775 A | 8/2010 |
| JP | 2011510592 A | 3/2011 |
| JP | 2011517172 A | 5/2011 |
| JP | 2012518359 A | 8/2012 |
| JP | 2013511217 A | 3/2013 |
| JP | 2013515435 A | 5/2013 |
| JP | 2013541882 A | 11/2013 |
| RU | 2236703 C2 | 9/2004 |
| WO | 0006273 A2 | 2/2000 |
| WO | WO-2005018171 A1 | 2/2005 |
| WO | WO-2006102294 A2 | 9/2006 |
| WO | WO2006105333 A1 | 10/2006 |
| WO | 2007040554 A2 | 4/2007 |
| WO | WO-2007103291 A1 | 9/2007 |
| WO | 2007149961 | 12/2007 |
| WO | WO2008018039 A2 | 2/2008 |
| WO | WO2008093298 A2 | 8/2008 |
| WO | WO2009027931 A2 | 3/2009 |
| WO | WO-2009075231 A1 | 6/2009 |
| WO | WO-2009096195 A1 | 8/2009 |
| WO | WO2009096757 A2 | 8/2009 |
| WO | 2009114631 A1 | 9/2009 |
| WO | WO-2010059926 A1 | 5/2010 |
| WO | 2010074471 A2 | 7/2010 |
| WO | 2010095802 A1 | 8/2010 |
| WO | WO-2010102035 A2 | 9/2010 |
| WO | WO2010150950 A1 | 12/2010 |
| WO | 2011060267 A1 | 5/2011 |
| WO | WO-2011085230 A2 | 7/2011 |
| WO | WO-2011087560 A2 | 7/2011 |
| WO | WO-2012030585 A2 | 3/2012 |

OTHER PUBLICATIONS

International Search Report and Written Opinion—PCT/US2011/054066—ISA/EPO—dated Dec. 22, 2011.

Merlin S. et al., "IEEE P802.11. Wireless LANs", 11ac Sounding protocol, Mar. 14, 2011, pp. 1-25.

Robert Stacey (Intel), et al., "IEEE P802.11. Wireless LANs", Proposed TGac Draft Amendment, doc.: IEEE 802.11-10/1361r3, Jan. 18, 2011, pp. 1-154.

Simone Merlin, et al., "VHT Control and Link Adaptation", Submission, doc.:IEEE802.11-11/0040r0, Jan. 18, 2011, pp. 1-15.

Imashioya R., et al., "Design of Very High Throughput Wireless LAN with Backward Compatibility," Proceedings of the 2010 IEICE (Institute of Electronics, Information and Communication Engineers) General Conference, Mar. 2, 2010, p. 570.

Liu Y., et al., "Protocol for SU and MU Sounding Feedback (doc.:IEEE.802.11-10/1091r0)", IEEE 802.11, Sep. 14, 2010 (Sep. 14, 2010), pp. Slide 1-Slide 7, XP002660721, Retrieved from the Internet: URL:https://mentor.ieee.org/802.11/dcn/10/11-10-1091-00-00ac-protocol-for-su-and-musounding-feedback.pptx [retrieved on Oct. 6, 2011] Slide 3.

Stacey R., et al., "Specification Framework for TGac," IEEE802.11-09/0992r17,Nov. 11, 2010.

Zhang H., et al., "11ac Explicit Sounding and Feedback, 802.11-10/1105r0", IEEE 802.11 TGac, Sep. 14, 2010 (Sep. 14, 2010), XP55018327, pp. 1-43, Retrieved from the Internet: URL: https://mentor.ieee.org/802.11/documents"is dcn=1105&is group=00ac [retrieved on Feb. 2, 2012].

IEEE 802.11n-2009, "IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput", IEEE Standard, IEEE, Piscataway, NJ, USA, Oct. 29, 2009 (Oct. 29, 2009), pp. C1-C502, XP017604244.

Liming H., et al., "Partial CSI feedback scheme for subchannel allocation in multiuser OFDM systems," Telecommunications, 2009, ICT'09, International Conference on May 27, 2009, pp. 382-386.

Asai Y., et al., "Update of Interference Management Using Beamforming Technique in OBSS Environment," IEEE802.11-10/1121r0, IEEE mentor,Sep. 13, 2010.

Robert, et al., "IEEE P802.11-09/0992R15—Specification Framework for TGac", IEEE P802.11 Wireless LANs, Sep. 16, 2010 (Sep. 16, 2010), pp. 1-27, XP002662889, Retrieved from the Internet: URL: https://mentor.ieee.org/802.11/dcn/09/11-09-0992-15-00ac-proposed-specificationframework-for-tgac.doc [retrieved on Nov. 7, 2011].

Taiwan Search Report—TW100135336—TIPO—dated Dec. 18, 2014.

Taiwan Search Report—TW100135336—TIPO—dated May 6, 2015.

Dictionary.com, [retrieved on Mar. 24, 2016]. Retrieved from the Internet: http://www.dictionary.com/browse/seperate.

Google.com, Definition, [retrieved on Mar. 24, 2016]. Retrieved from the Internet: https://www.google.com/#q=definition+of+separate.

Stacey R., et al., "Proposed Specification Framework edits for Preamble Structure and A-MPDU", IEEE 802.11-10/0113r0, Jan. 21, 2010, pages 7.

Zhang H., et al., "802.11ac Preamble", IEEE 802.11-10/0070R0, [Online] Jan. 18, 2010 (Jan. 18, 2010), pp. 1-11, XP002610760, Retrieved from the Internet: URL:https://mentor.ieee.org/802.11/dcn/10/11-10-0359-00-00ac-802-11ac-preambie.ppt [retrieved on Nov. 22, 2010].

\* cited by examiner

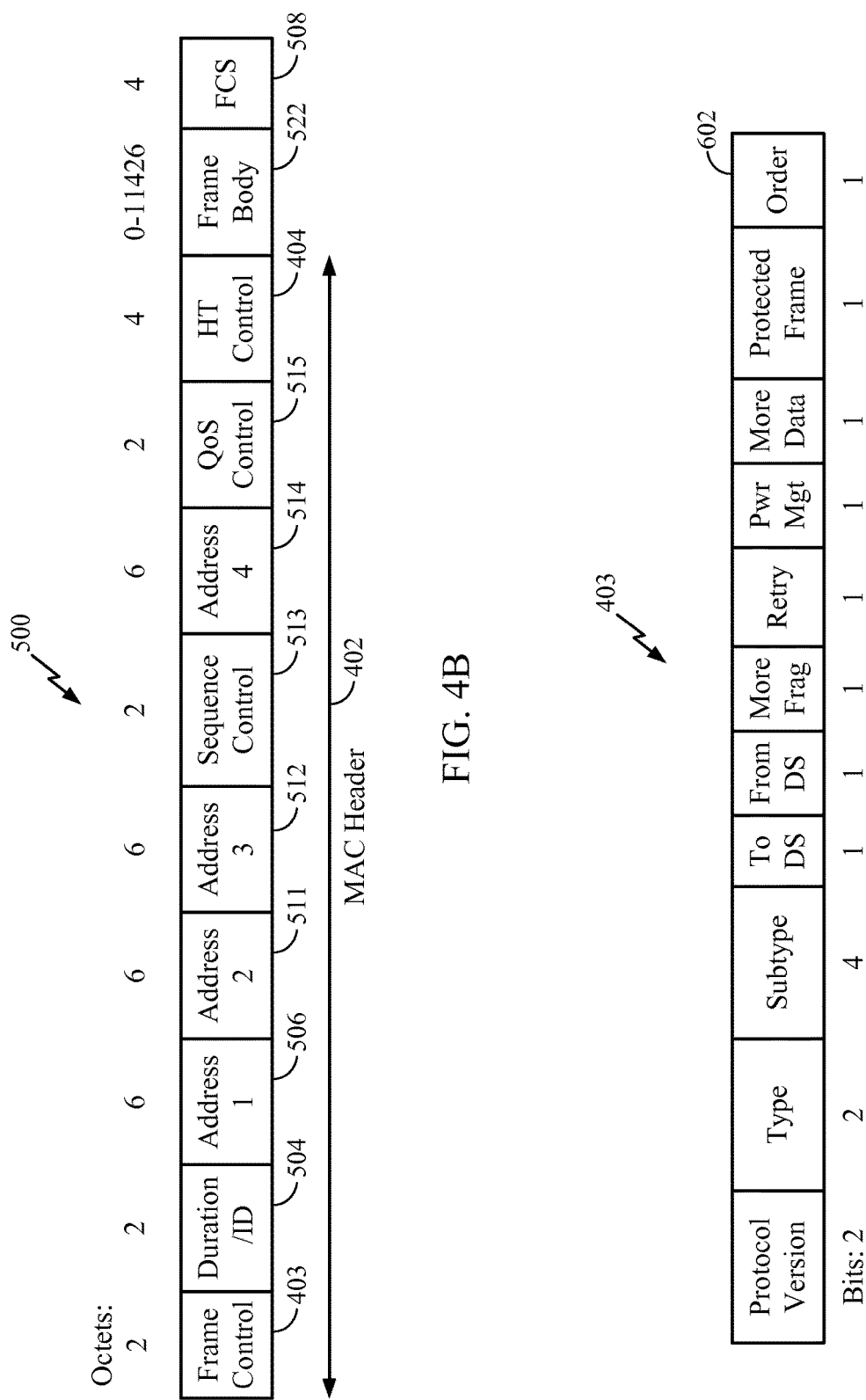

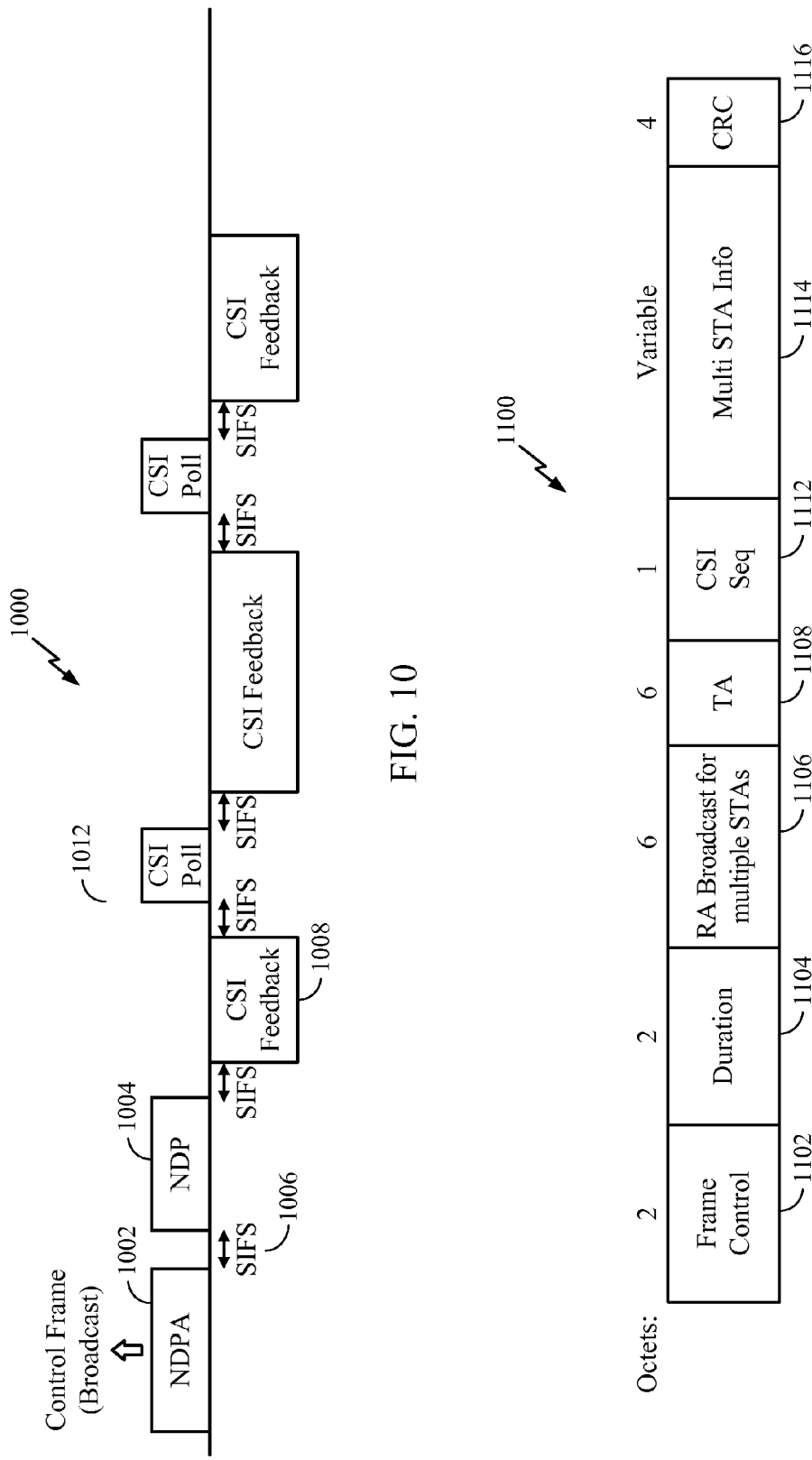

SYSTEMS, METHODS AND APPARATUS FOR DETERMINING CONTROL FIELD AND MODULATION CODING SCHEME INFORMATION

CROSS REFERENCE TO RELATED APPLICATION(S)

This application claims the benefit of U.S. Provisional Application No. 61/387,542, filed Sep. 29, 2010; U.S. Provisional Application No. 61/389,495, filed Oct. 4, 2010; U.S. Provisional Application No. 61/405,283, filed Oct. 21, 2010; U.S. Provisional Application No. 61/422,098, filed Dec. 10, 2010; U.S. Provisional Application No. 61/432,115, filed Jan. 12, 2011; U.S. Provisional Application No. 61/405,194, filed Oct. 20, 2010; and U.S. Provisional Application No. 61/409,645, filed Nov. 3, 2010; the entire content of each of which is incorporated herein by reference. This application further claims the benefit of U.S. Provisional Application No. 61/414,651, filed Nov. 17, 2010. This application is related to U.S. application Ser. No. 13/247,023, titled "SYSTEMS AND METHODS FOR COMMUNICATION OF CHANNEL STATE INFORMATION," filed on even date herewith, U.S. application Ser. No. 13/247,047, titled "SYSTEMS AND METHODS FOR COMMUNICATION OF CHANNEL STATE INFORMATION," filed on even date herewith, U.S. Application Ser. No. 13/247,062, titled "SYSTEMS AND METHODS FOR COMMUNICATION OF CHANNEL STATE INFORMATION," filed on even date herewith, U.S. Application Ser. No. 13/247,086, titled "SYSTEMS AND METHODS FOR COMMUNICATION OF CHANNEL STATE INFORMATION," filed on even date herewith, U.S. Application Ser. No. 13/247,124, titled "SYSTEMS, METHODS AND APPARATUS FOR DETERMINING CONTROL FIELD AND MODULATION CODING SCHEME INFORMATION," filed on even date herewith, U.S. application Ser. No. 13/247,144, titled "SYSTEMS, METHODS AND APPARATUS FOR DETERMINING CONTROL FIELD AND MODULATION CODING SCHEME INFORMATION," filed on even date herewith, each of which are incorporated herein by reference, in their entirety.

BACKGROUND

Field

The present disclosure generally relates to wireless communications.

Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Various aspects of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various aspects are used to manage monitoring of a page channel or the like.

Certain aspects of this disclosure provide a method of wireless communication. The method comprises receiving a data unit comprising an indicator signifying whether a control field is present in the data unit. The method comprises, if the indicator signifies that the control field is present, determining whether the control field comprises a first type or a second type based at least in part on a subfield of the data unit. The method comprises processing the control field based on the type of the control field.

Certain aspects of this disclosure provide an apparatus for wireless communication. The apparatus comprises a receiver configured to receive a data unit comprising an indicator signifying whether a control field is present in the data unit. The apparatus comprises a processing system configured to if the indicator signifies that the control field is present, determine whether the control field comprises a first type or a second type based at least in part on a subfield of the data unit. The processing system is further configured to process the control field based on the type of the control field.

Certain aspects of this disclosure provide an apparatus for wireless communication. The apparatus comprises means for receiving a data unit comprising an indicator signifying whether a control field is present in the data unit. The apparatus comprises means for determining, if the indicator signifies that the control field is present, whether the control field comprises a first type or a second type based at least in part on a subfield of the data unit. The apparatus comprises means for processing the control field based on the type of the control field.

Certain aspects of this disclosure provide a computer program product for wirelessly communicating comprising a computer readable medium comprising instructions. The instructions when executed cause an apparatus to receive a data unit comprising an indicator signifying whether a control field is present in the data unit. The instructions when executed cause the apparatus to if the indicator signifies that the control field is present, determine whether the control field comprises a first type or a second type based at least in part on a subfield of the data unit. The instructions when executed cause the apparatus to process the control field based on the type of the control field.

Certain aspects of this disclosure provide an user terminal for wireless communication. The user terminal comprises at least one antenna. The user terminal comprises a receiver configured to receive, via the antenna, a data unit comprising an indicator signifying whether a control field is present in the data unit. The user terminal comprises a processing system configured to if the indicator signifies that the control field is present, determine whether the control field comprises a first type or a second type based at least in part on a subfield of the data unit. The processing system is further configured to process the control field based on the type of the control field.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4B illustrates an example of a frame that includes the header of the data unit of FIG. 4A.

FIG. 4C illustrates an example of a frame control field of the header of the data unit of FIG. 4A.

FIG. 10 illustrates an exemplary channel state information (CSI) feedback protocol.
FIG. 11 illustrates an exemplary Null Data Packet Announcement (NDPA) frame.

Figure 1:
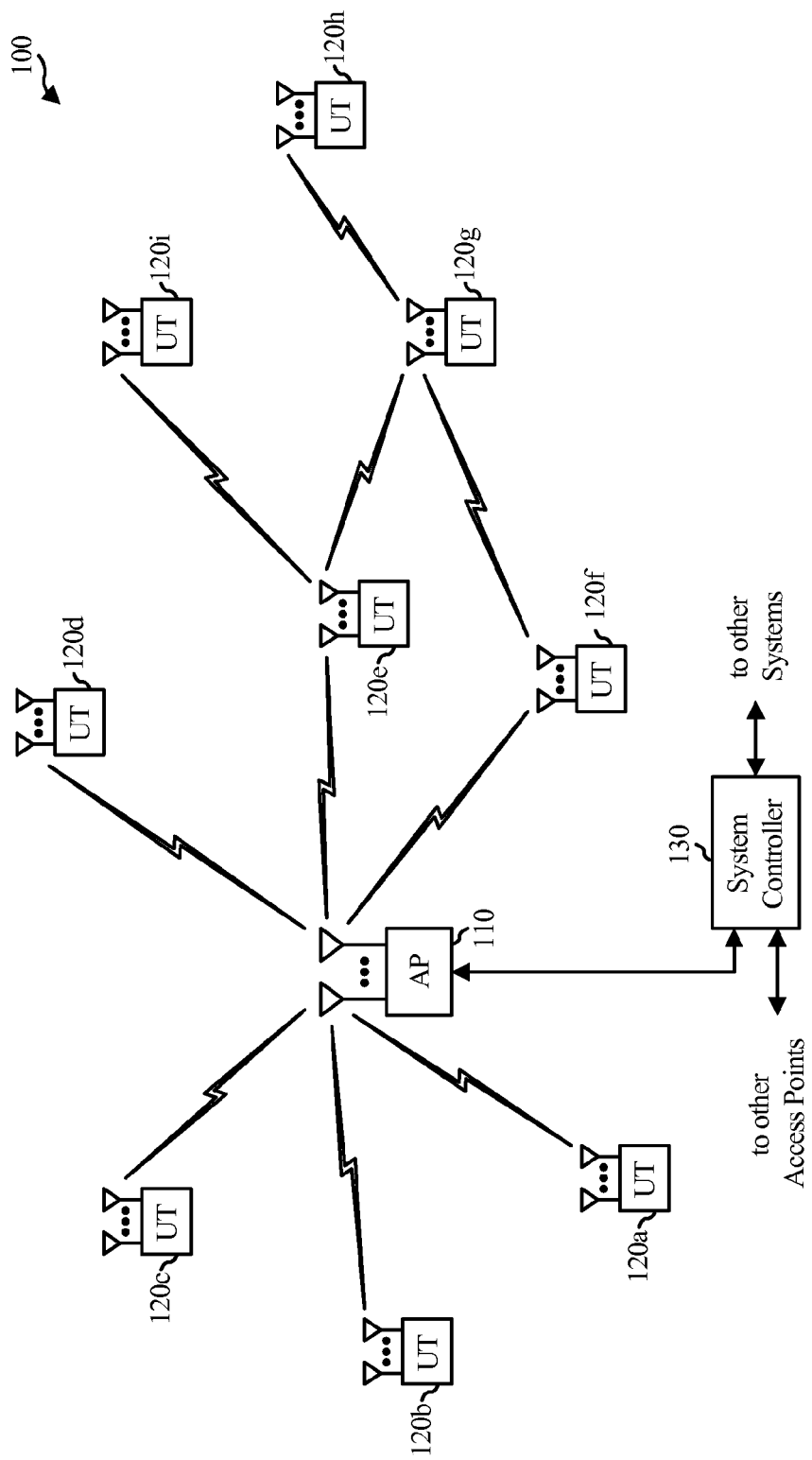
FIG. 1 is a diagram of a wireless communications network in accordance with certain aspects of the present disclosure.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As an AT or UE moves through such a network, the access terminal may be served in certain locations by ANs that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
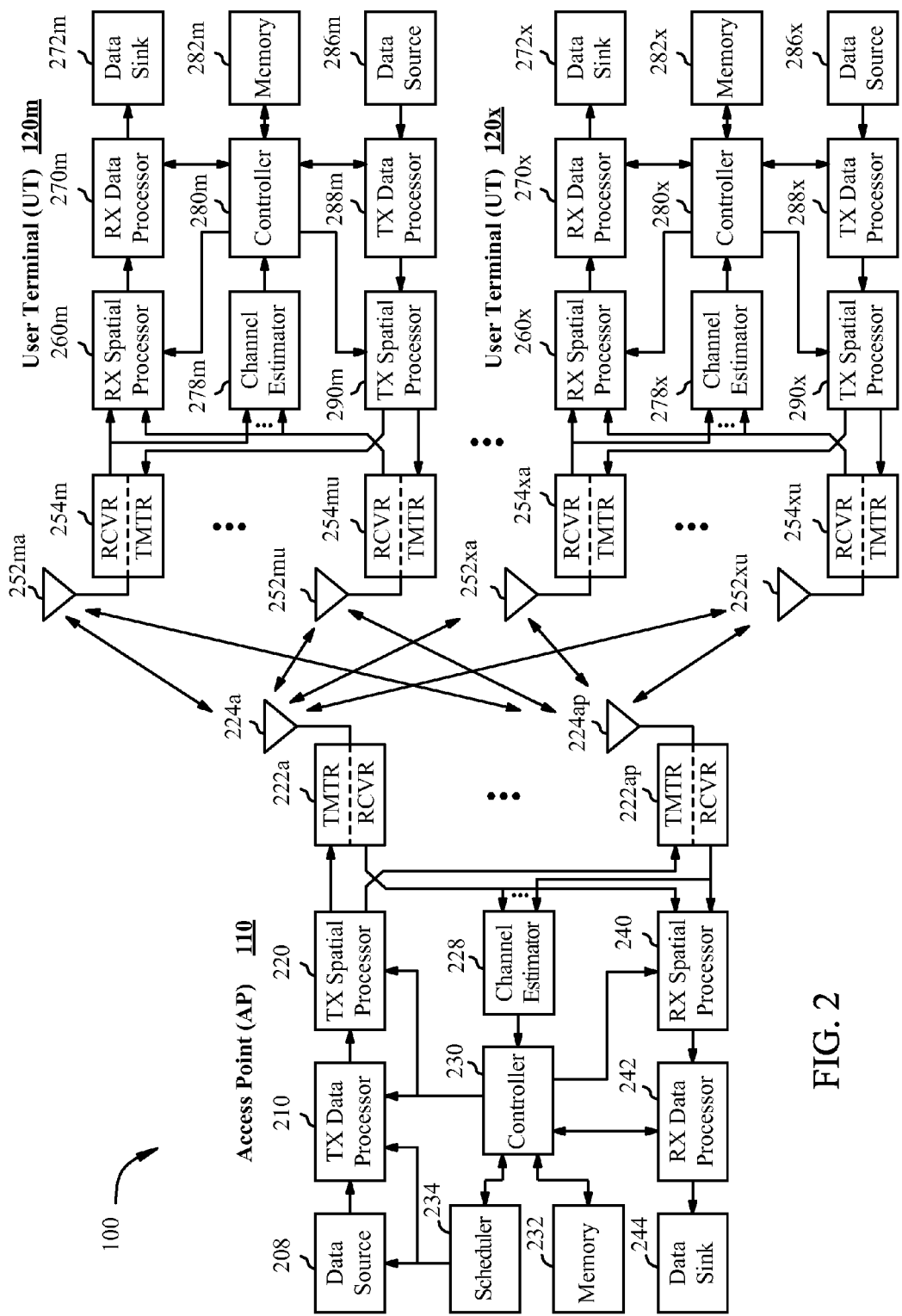
FIG. 2 is a block diagram of an example access point and user terminals in accordance with certain aspects of the present disclosure.

FIG. 2 illustrates a block diagram of access point 110 and two user terminals 120m and 120x in MIMO system 100. The access point 110 is equipped with N, antennas 224a through 224t. User terminal 120m is equipped with $N_{ut, m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
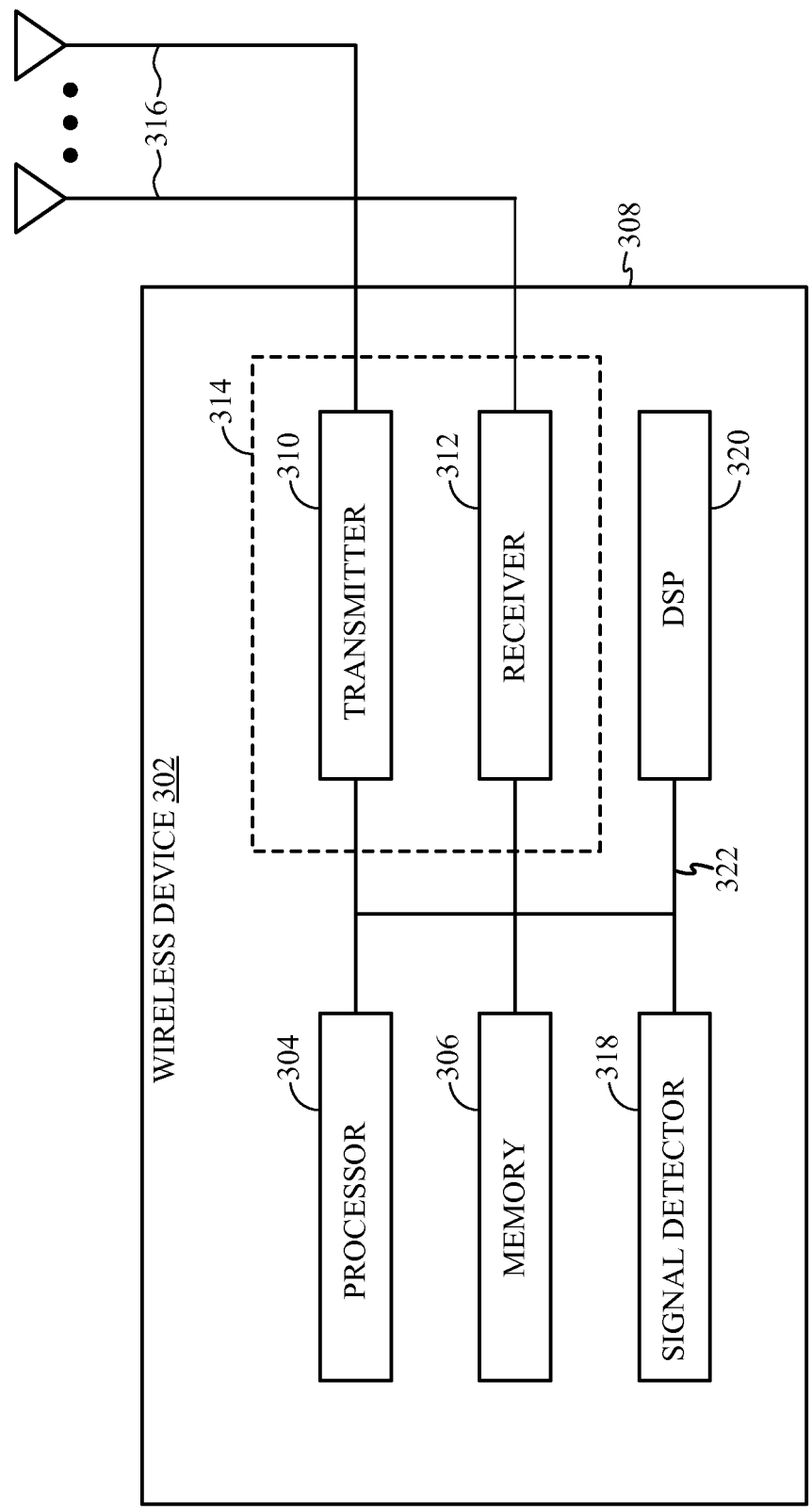
FIG. 3 is a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

The wireless system 100 illustrated in FIG. 1 may operate in accordance with IEEE 802.11ac wireless communications standard. The IEEE 802.11ac represents a new IEEE 802.11 amendment that allows for higher throughput in IEEE 802.11 wireless networks. The higher throughput may be realized through several measures such as parallel transmissions to multiple stations (STAs) at once, or by using a wider channel bandwidth (e.g., 80 MHz or 160 MHz). The IEEE 802.11ac is also referred to as Very High Throughput (VHT) wireless communications standard.

Figure 4A:
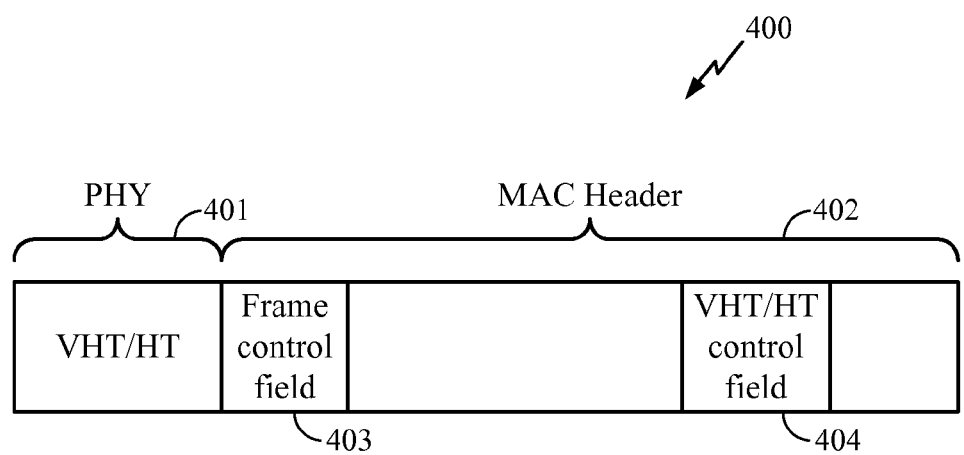
FIG. 4A is a schematic diagram of a data unit in accordance with certain aspects of the present disclosure.

FIG. 4A is a schematic diagram of a data unit 400 in accordance with certain aspects of the present disclosure. In certain aspects, the data unit 400 may be a physical layer protocol data unit (PPDU), that may be transmitted between devices, such as the access point 110 and user terminals 120, in the wireless communication system 100 of FIG. 1. The data unit 400 includes a physical layer (PHY) portion 401 and a media access control (MAC) header 402. A body portion or MAC frame body (not illustrated) may follow the MAC header 402. Within the MAC header 402, there is a frame control field 403 and an optional control field 404 that can be at least one of two types (also referred to as "formats"). For example, in one implementation the control field 404 is a very high throughput (VHT) control field and in another the control field 404 is a high throughput (HT) control field. In some implementations the control field 404 is set on a per data unit basis to be one of a VHT control field and an HT control field. Further, a device receiving the data unit 400 may process the data unit 400 based on which type of control field (e.g., HT or VHT) is included in the MAC header 402. As such, there lies a challenge to determine which type (VHT or HT) of control field is present, if one is present at all.

FIG. 4B illustrates an example of a MAC frame 500 that includes the MAC header 402 of FIG. 4A. The MAC frame 500 includes the MAC header 402. The first three fields (the frame control field 403, a duration/ID field 504, and an address 1 field 506) and the last field (a frame check sequence (FCS) field 508) constitute the minimal frame format of the MAC frame 500, and are present in all MAC frames. The remaining fields illustrated below (an address 2 field 511, an address 3 field 512, a sequence control field 513, an address 4 field 514, a QoS control field 515, the control field 404, and a frame body 522) are present only in certain frame types and subtypes. Although the control field 404 is labeled as an HT control field in the aspect illustrated below, the HT control field 404 may be formatted as HT or as VHT.

FIG. 4C illustrates an example of a frame control field 403 of the MAC header 402 of FIG. 4A. The frame control field 403 includes a protocol version sub-sub-field comprising 2 bits, a type sub-field comprising 2 bits, a subtype sub-field comprising 4 bits, a to ds sub-field comprising 1 bit, a from ds sub-field comprising 1 bit, a more frag sub-field comprising 1 bit, a retry sub-field comprising 1 bit, a power management sub-field comprising 1 bit, a more data sub-field comprising 1 bit, a protected frame sub-field comprising 1 bit, and an order sub-field comprising 1 bit. The last sub-field in the frame control field 403 comprises an order field 602 that includes 1 bit. The order field 602 may also be referred to as the order bit. When the data unit 400 is a HT or VHT data unit, the order bit 602 indicates whether the control field 404 is present in the MAC header 402 (and thus the MAC frame 500 and the data unit 400). If the order bit 602 is set to "1," the control field 404 is present. The control field 404 is not present if the order bit 602 is set to "0."

Before a node evaluates the order bit 602 to determine whether the control field 404 is present, the node may first determine whether the data unit 400 is an HT or VHT data unit. In some aspects, this determination is based on a TXVECTOR in the PHY portion 401 of the data unit 400.

Figure 4D:
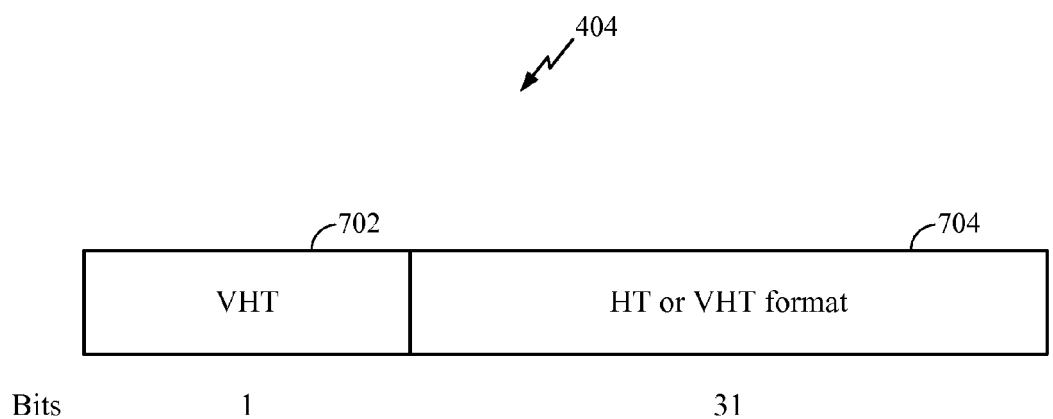
FIG. 4D illustrates an example of a control field of the header of the data unit of FIG. 4A.

FIG. 4D illustrates an example of a control field 404 of the MAC header 402 of FIG. 4A. The control field includes a VHT field 702 that indicates whether a sub-field 704 has an HT or VHT format. When the VHT field 702 is set to "0," the HT format is used for the sub-field 704. When the VHT field 702 is set to "1," however, the sub-field 704 has a VHT format. In some aspects, the VHT field 702 comprises a reserved bit in the control field 404. In some aspects, reserved bit comprises the first bit in the control field 404. In some aspects, a modulation coding scheme (MCS) feedback (MFB) is indicated in the sub-field 704 in response to a solicitation for such feedback as discussed below.

In another aspect, the control field 404 includes at least one of a link adaptation control subfield that may be 16 bits, a reserved subfield that may be 14 bits, an AC constraint subfield that may be 1 bit, and a reverse direction grant (RDG) subfield that may be 1 bit. The reserved subfield may comprise one or more additional subfields.

Figure 5A:
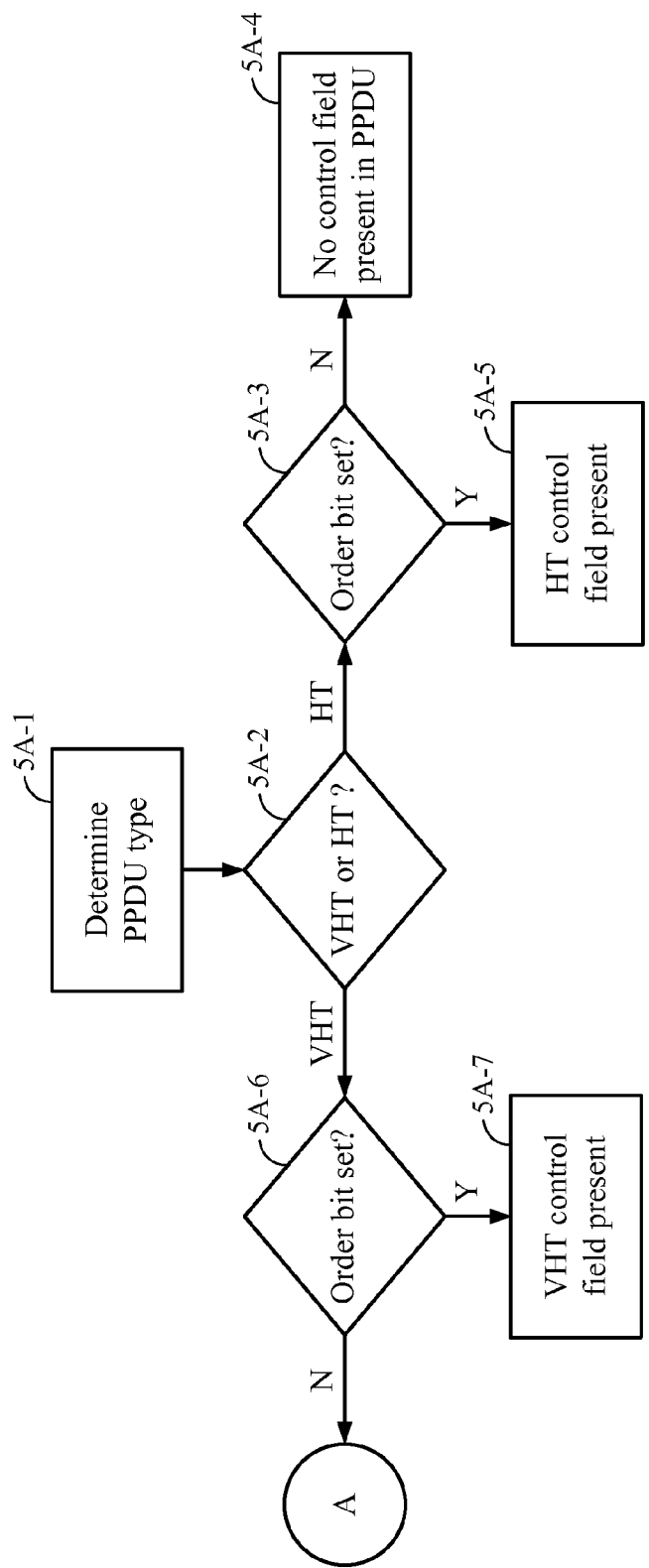
FIG. 5A is a flowchart of an implementation of a method.

FIG. 5A is a flowchart of an implementation of a method of determining whether a control field is present and its type. As represented by block 5A-1, the method includes determining the type of data unit received. As represented by block 5A-2, the method includes determining if the data unit type is VHT or HT. If the data unit type is HT (HT path from 5A-2), as represented by block 5A-3, the method includes parsing the order bit in the data unit. If the order bit is not set (No path from 5A-3), there is no control field in the data unit that is either a VHT control field or HT control field. On the other hand, if the order bit is set (Yes path from 5A-3), a HT control field is present as represented by block 5A-5.

Referring again to block 5B-2, if the data unit type is VHT (VHT path from 5B-2), as represented by block 5B-3, the method includes parsing the order bit in the data unit. If the order bit is not set (No path from 5A-6), there is no control field in the data unit that is either a VHT control field or HT control field as represented by block 5A-4. On the other hand, if the order bit is set (Yes path from 5A-6), a VHT control field is present as represented by block 5A-7.

Figure 5B:
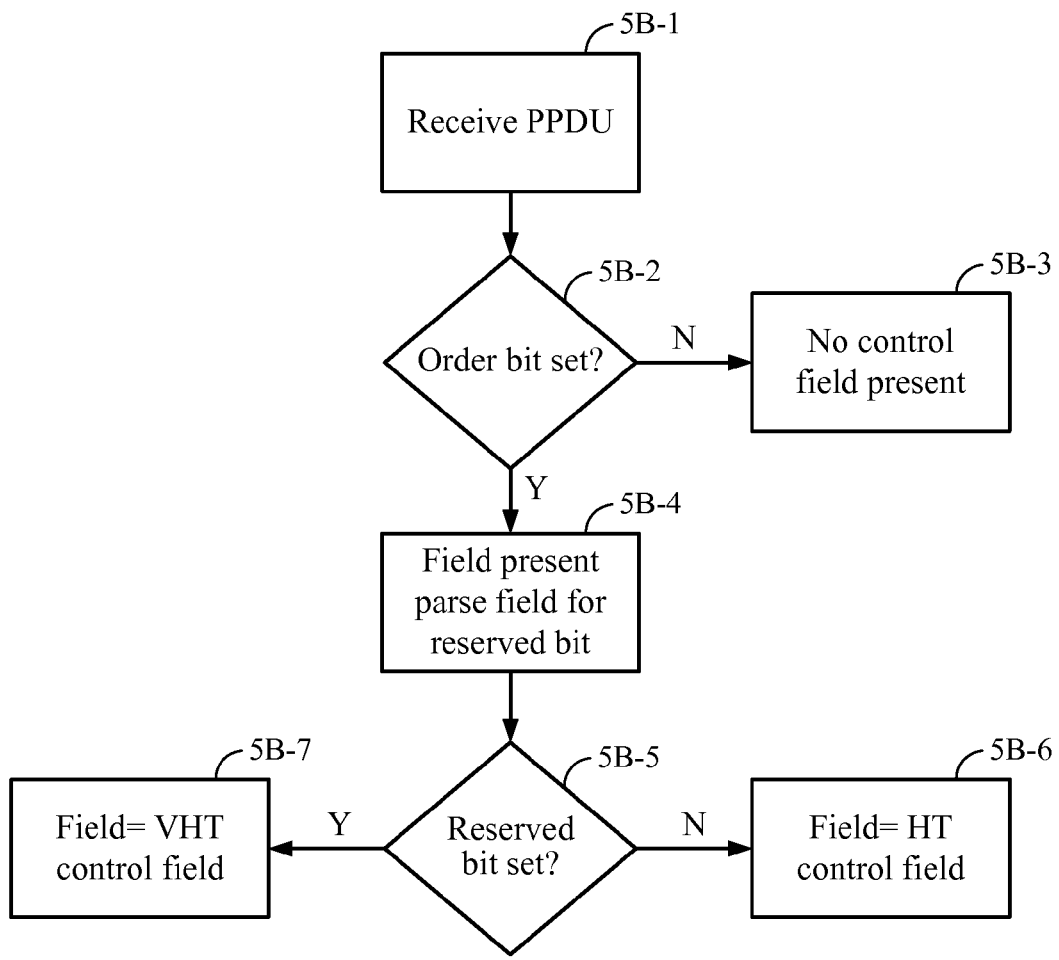
FIG. 5B is a flowchart of an implementation of a method.

FIG. 5B is a flowchart of an implementation of another method of determining whether a control field is present and its type. As represented by block 5B-1, the method includes receiving a data unit. As represented by block 5B-2, the method includes parsing the order bit in the data unit. If the order bit is not set (No path from 5B-2), there is no control field in the data unit that is either a VHT control field or HT control field. On the other hand, if the order bit is set (Yes path from 5B-2), there is a control field in the data unit that is either a VHT control field or HT control field. As represented by block 5B-4, the method includes parsing the control field for a reserved bit. If the reserved bit is not set (No path from 5B-5), as represented by block 5B-6, the method includes deciding that the control field is a HT control field. On the other hand, if the reserved bit is set (Yes path from 5B-5), as represented by block 5B-7, the method includes deciding that the control field is a VHT control field.

Figure 6A:
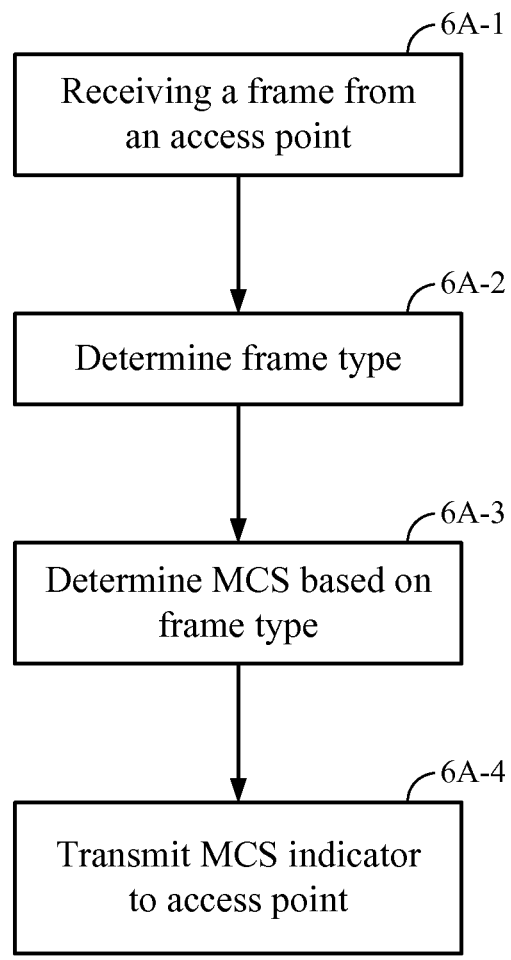
FIG. 6A is a flowchart of an implementation of a method.

FIG. 6A is a flowchart of an implementation of a method of communicating a modulation coding scheme (MCS) indicator from an access terminal to an access point. As represented by block 6A-1, the method includes receiving a frame from an access point or another access terminal. As represented by block 6A-2, the method includes determining the frame type. As represented by block 6A-3, the method includes determining the MCS based at least in part on the frame type. As represented by block 6A-4, the method includes transmitting an indicator of the determined MCS.

Figure 6B:
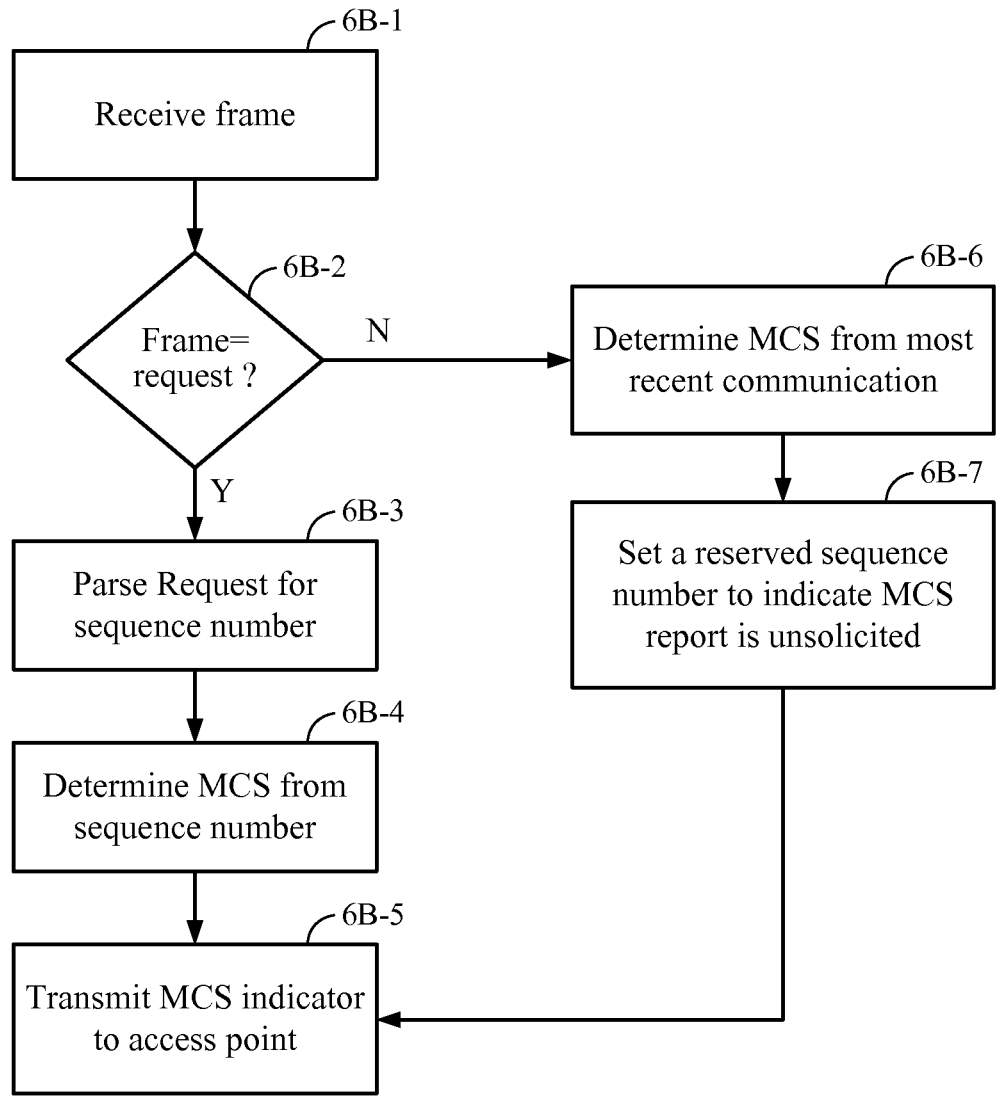
FIG. 6B is a flowchart of an implementation of a method.

FIG. 6B is a flowchart of an implementation of a method of communicating a modulation coding scheme (MCS) indicator from an access terminal to an access point. As represented by block 6B-1, the method includes receiving a frame. As represented by block 6B-1, the method includes determining whether the frame includes a request. If the frame includes a request (Yes path from 6B-2), as represented by block 6B-3, the method includes parsing the request for a sequence number. As represented by block 6B-4, the method includes determining the MCS from the sequence number. As represented by block 6B-5, the method includes transmitting an indicator of the MCS to the access point.

Referring again to block 6B-2, if the frame includes a request (Yes path from 6B-2), as represented by block 6B-6, the method includes determining the MCS from the most recent communication. As represented by block 6B-7, the method includes setting a reserved sequence number to indicate that the MCS report is unsolicited by the access point.

Figure 7A:
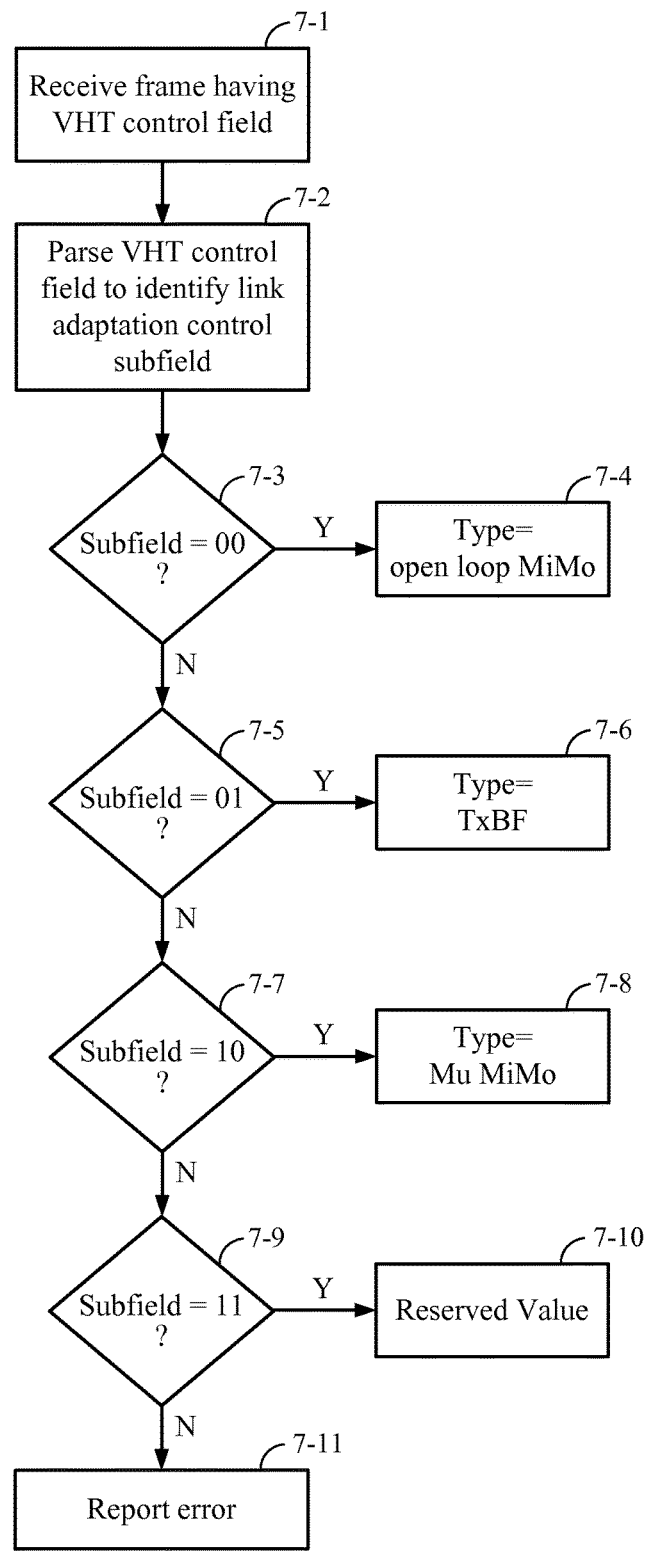
FIG. 7A is a flowchart of an implementation of a method.

FIG. 7A is a flowchart of an implementation of a method of determining an MCS type of a received frame. As represented by block 7-1, the method includes receiving a frame having a VHT control field. As represented by block 7-2, the method includes parsing the VHT control field to identify a link adaptation control subfield.

As represented by block 7-3, the method includes determining if the value of the subfield is "00". If the value of the subfield is "00", as represented by block 7-4, the method includes deciding that the MCS type is open loop (OL) MIMO.

As represented by block 7-5, the method includes determining if the value of the subfield is "01". If the value of the subfield is "01", as represented by block 7-6, the method includes deciding that the MCS type is transmit beamforming (TxBF).

As represented by block 7-7, the method includes determining if the value of the subfield is "10". If the value of the subfield is "10", as represented by block 7-8, the method includes deciding that the MCS type is multi-user (MU) MIMO.

As represented by block 7-9, the method includes determining if the value of the subfield is "11". If the value of the subfield is not "11", as represented by block 7-10, the method includes treating the subfield as a reserved value. If the value of the subfield is not "11", as represented by block 7-11, the method includes reporting an error.

Figure 7B:
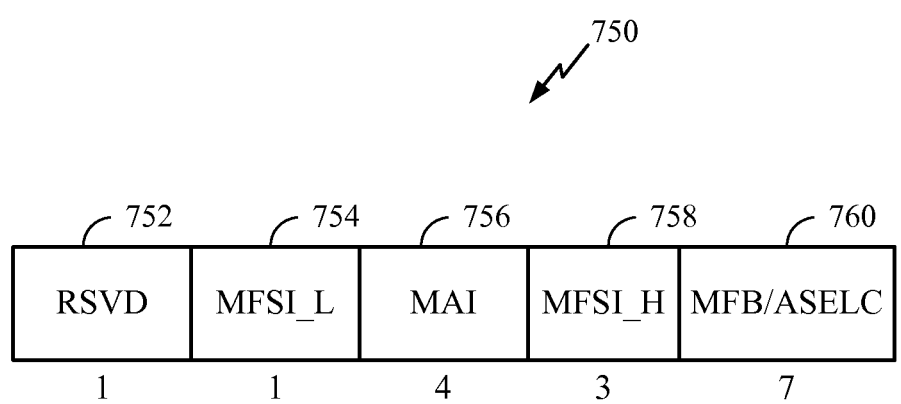
FIG. 7B illustrates an example of a link adaptation control subfield having an indicator that is at least four bits.

In another implementation, the VHT control field includes a link adaptation control subfield having an indicator that is at least four bits. FIG. 7B illustrates an example of a link adaptation control subfield 750 where 4 bits of the link adaptation control subfield 750 may be used as an indicator. The link adaptation control subfield 750 includes a RSVD field 752 comprising 1 bit, followed by a MFSI_L field 754 comprising 1 bit, followed by a MAI field 756 comprising 4 bits, followed by a MFSI H field 758 comprising 3 bits, followed by a MFB/ASELC field 760 comprising 7 bits. The four bits of the link adaptation control subfield 750 that make up the indicator may be the second, seventh, eighth and ninth bits of the link adaptation control subfield 750. As shown, the second bit is is the MFSI_L field 754, and the seventh, eighth and ninth bits of the indicator is the MFSI_H field 758. The value of the four bit indicator can be used to communicate information such as the MCS type. For example, in one implementation an indicator value of '1100' can be used to indicate that the MCS type comprises OL MIMO. Additionally, an indicator value of '1001' can be used to indicate that the MCS type comprises open TxBF. Additionally, an indicator value of '1010' can be used to indicate that the MCS type comprises MU MIMO. Additionally, at least some of the values from '1011' to '1111' can be utilized as reserved indicator sequences, one or more of which can later be used to represent other information.

Figure 8:
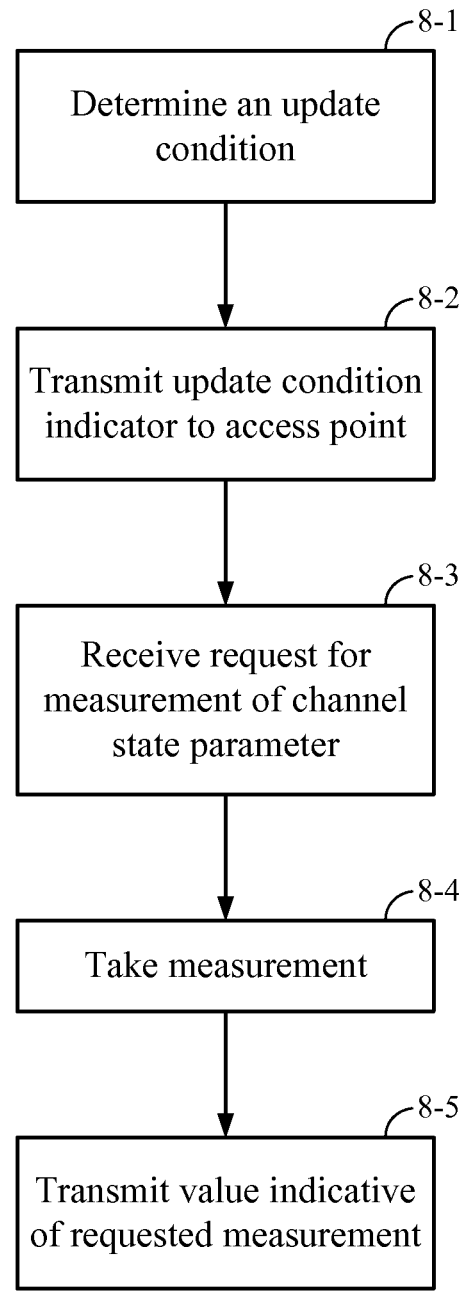
FIG. 8 is a flowchart of an implementation of a method.

FIG. 8 is a flowchart of an implementation of a method of prompting an access point to request the measurement of at least one parameter characterizing a wireless channel, which may be performed by an access terminal. As represented by block 8-1, the method includes determining an update condition. As represented by block 8-2, the method includes transmitting an update condition indicator to an access point. As represented by block 8-3, the method includes receiving a request for a measurement of at least one parameter characterizing a wireless channel. As represented by block 8-4, the method includes taking the measurement. As represented by block 8-5, the method includes transmitting a value indicative of the measurement.

In certain aspects, a frame, such as the MAC frame 500, may be referred to as a "carried frame" and wrapped in another frame, which may be referred to herein as a "wrapper frame." Accordingly, the wrapper frame comprises the carried frame. The wrapper frame may be transmitted and received as part of a PPDU. The wrapper frame may also include additional information about the wrapper frame and the carried frame. The wrapper frame may comprise a type field, a subtype field, a control field, and the carried frame. Each of the type field, subtype field, and control field may comprise one or more bits. The value of the bits may indicate information about the wrapper frame and the control frame as discussed below.

The type field may indicate that the wrapper frame is a wrapper frame or another type of frame. If the type field indicates the frame is a wrapper frame, the subtype field may indicate that the wrapper frame is a wrapper for a control frame (the carried frame), or a wrapper for some other type of frame. If the type and subtype fields indicate the frame is a wrapper frame for a control frame, the control field may indicate whether the carried frame uses an HT format or a VHT format (e.g., is a HT control frame or a VHT control frame). The control field may have a reserved subfield, and the format of the carried frame may be based on the value of the reserved subfield. The reserved subfield may comprise a single bit. In some aspects, the reserved subfield may comprise a plurality of bits. For example, the reserved subfield may comprise at least one of the $1^{st}$, $21^{st}$ or $22^{nd}$ bit in the control field, and any of the $26^{th}$-$30^{th}$ bits in the control field.

A receiver of the wrapper frame can process the carried frame based on the determination it is a control frame and the format of the carried frame. In particular, a receiver first determines the wrapper frame is a wrapper frame carrying a control frame, then looks to the control field to determine the format of the control frame. The receiver then can process the carried control frame based on the determined format.

The carried control frame may have a similar format as MAC frame 500. For example, the carried control frame may comprise at least one of a duration field such as the duration field 504, an address field such as the address 1 field 506, a carried frame control field such as the HT control field 404, and an FCS field such as the FCS field 508.

Figure 9A:
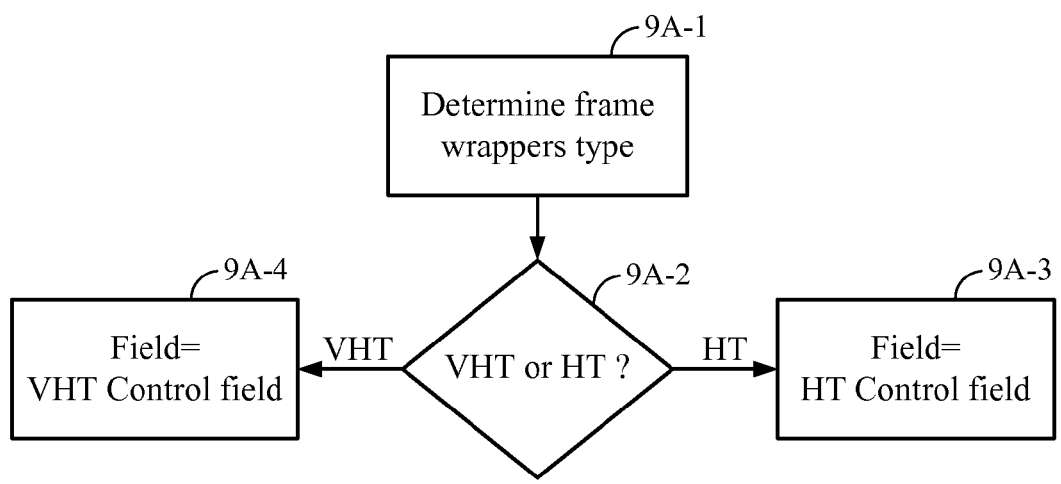
FIG. 9A is a flowchart of an implementation of a method.

FIG. 9A is a flowchart of an implementation of a method of determining the type of control field included in a frame wrapper having a carried frame. As represented by block 9A-1, the method includes determining the frame wrapper type. As represented by block 9A-2, the method includes determining if the data unit type is VHT or HT. If the data unit type is HT (HT path from 9A-2), as represented by block 9A-3, a HT control field is present. If the data unit type is VHT (VHT path from 9A-2), as represented by block 9A-4, a VHT control field is present.

Figure 9B:
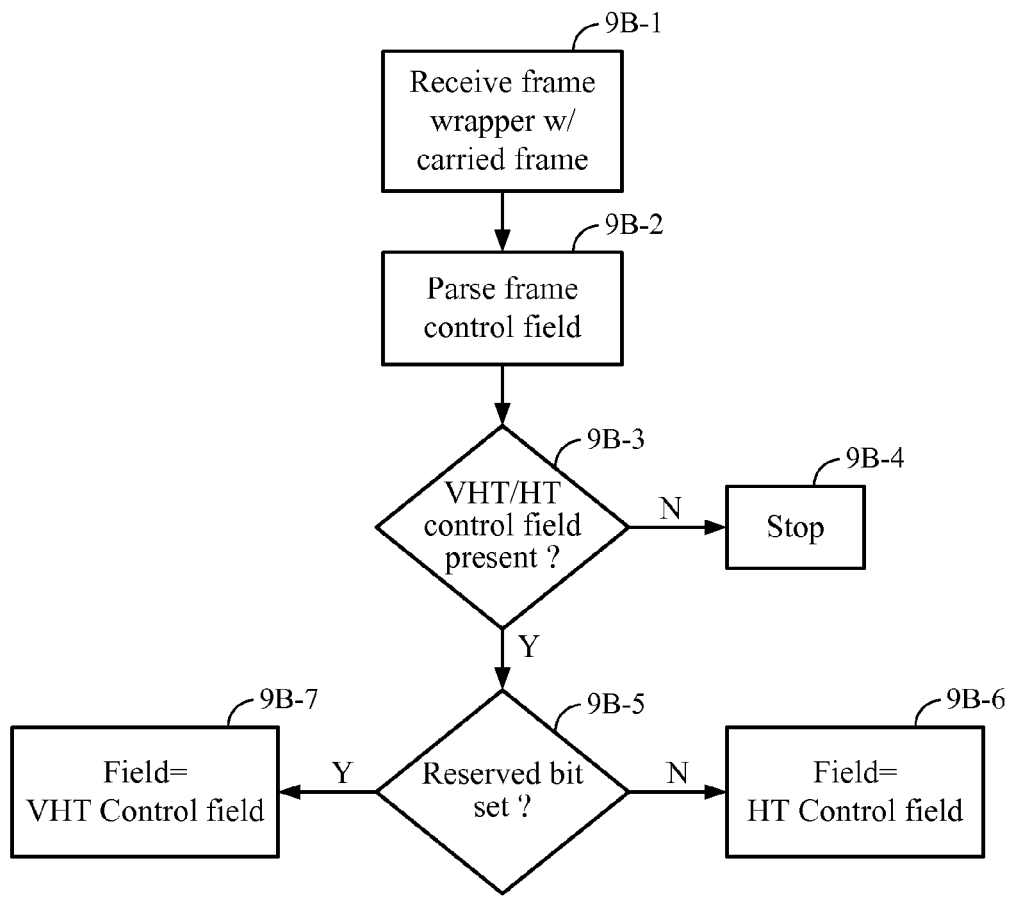
FIG. 9B is a flowchart of an implementation of a method.

FIG. 9B is a flowchart of an implementation of another method of determining the type of control field included in a frame wrapper having a carried frame. As represented by block 9B-1, the method includes determining a frame wrapper type. As represented by block 9B-2, the method includes parsing a frame control field to determine if a VHT or HT control field is present. If a control field is not present (No path from 9B-3), the method includes stopping. If a control field is present (Yes path from 9B-3), the method includes parsing a reserved bit as represented by block 9B-5. If the reserved bit is not set (No path from 9B-5), as represented by block 9B-6, the method includes deciding that the control field is a HT control field. On the other hand, is the reserved bit is set (Yes path from 9B-5), as represented by block 9B-7, the method includes deciding that the control field is a VHT control field.

In certain aspects a first wireless node, such as the AP 110, may request channel state information (CSI) from a second wireless node, such as the UT 120. The UT 120 may respond to the request with the CSI.

FIG. 10 illustrates an exemplary CSI feedback protocol 1000. The AP 110 may transmit to one or more user terminals 120 a Null Data Packet Announcement (NDPA) frame 1002 followed by a Null Data Packet (NDP) frame 1004 after a Short Inter-Frame Symbol (SIFS) period 1006. The NDPA frame 1002 may comprise Association Identifiers (AIDs) of the user terminals 120 that should transmit computed CSI feedback messages to the AP 110.

Those user terminals 120 that are not identified in the NDPA may ignore the following NDP frame 1004. The NDP frame 1004 may comprise a sounding frame utilized by each of the identified user terminals 120 to compute corresponding CSI feedback. A first listed user terminal 120 within the NDPA frame 1002 may transmit CSI feedback 1008 subsequent to a SIFS period after the transmission of the NDP frame 1004, as illustrated in FIG. 10. Other identified user terminals 120 may be polled by utilizing a CSI poll message (or a sounding poll message) for each other user terminal 120, and may thereafter transmit CSI feedback to the AP 110.

FIG. 11 illustrates an exemplary NDPA frame 1002. In some aspects, the NDPA frame 1002 may be referred to as a CSI request message, which may be of type control frame. The NDPA frame 1002 includes a frame control field 1102, a duration field 1104, an RA broadcast field 1106, a TA field 1108, a CSI sequence (or sounding sequence) field 1112, an user terminal (STA) information field 1114, and a frame check sequence (FCS) field 1116.

In the illustrated aspect, the frame control field 1102 comprises 16 bits, and the duration field 1104 comprises 16 bits and may include a length of the NDPA frame 1002. The RA broadcast field 1106 comprises 48 bits, and may comprise a broadcast/multicast address for multiple STAs. The TA field 1108 comprises 48 bits, and may comprise an address or identifier of a device transmitting the NDPA frame 1002.

The CSI sequence field 1112 comprises 8 bits. The CSI sequence field 1112 may comprise a sequence number for the NDPA frame 1002 or other descriptor uniquely identifying the NDPA frame 1002.

The length of the STA information field 1114 may vary, and may include information for each user terminal 120 from which CSI is requested. The FCS field 1116 comprises 32 bits and may comprise data for determining a cyclic redundancy check (CRC), as illustrated above.

A user terminal 120 identified in the NDPA frame 1002 and receiving the NDPA frame 1002 and NDP frame 1004 may respond with CSI information in a CSI feedback frame 1008.

In some aspects, the AP 110 may require or request that the CSI be transmitted using a particular modulation coding scheme (MCS) by indicating in a message to the user terminal 120 a particular MCS to use. The AP may choose the MCS based on feedback information it receives from the user terminal 120, MCS Feedback (MFB). The MFB may include MCS estimates (estimates of which MCS is best used in the current environment). In certain aspects, an AP 110 sends a request to the user terminal 120 for an MFB and the user terminal 120 responds with the MFB. The STA therefore calculates the MCS estimates based on characteristics of the received request. Further, the AP 110 determines an MCS to be used based on the MFB and the characteristics of the request it sent to the user terminal 120.

In some aspects, the user terminal 120 may be configured to transmit an unsolicited MFB to the AP 110, meaning the user terminal 120 sends an MFB without receiving a request for an MFB from the AP 110. The AP 110 is not expecting the MFB, and therefore does not know which communication from the AP 110 the user terminal 120 based the MFB on. The AP 110 needs to know which communication the user terminal 120 based the MFB on in order to properly select an MCS for communication.

Accordingly, when the AP 110 receives the unsolicited MFB, the AP 110 first determines it is an unsolicited MFB. The AP 110 may make this determination based on an indicator (e.g., a field (e.g., an MFSI (MCS Feedback (MFB) Sequence Identifier) field) in the MFB that indicates it is an unsolicited MFB. The AP 110 then determines which communication (e.g., one of a plurality of communications the AP 110 transmitted to the user terminal 120) the MFB is based on. In order to help the AP 110 make this determination, the MFB may also include a group ID (GID) field, a beamforming field, and/or may be transmitted using a particular MCS. The AP 110 may then identify which communication the AP 110 most recently sent to the user terminal 120 has a GID, a beamforming value, and/or used a MCS that matches that of the MFB. The communication most recently sent in time with matching characteristics is identified as the communication for which the MFB was sent. The AP 110, using the MFB and the identified communication, may then determine an MCS for the user terminal 120 to use. The AP 110 may then transmit an indication to the user terminal 120 of the MCS to be used and/or transmit data itself using the MCS.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations, module, or steps illustrated in Figures, those operations may have corresponding counterpart means-plus-function components. For example, a user terminal may comprise means for receiving a data unit comprising an indicator signifying whether a control field is present in the data unit, means for determining, if the indicator signifies that the control field is present, whether the control field comprises a first type or a second type based at least in part on a subfield of the data unit, and means for processing the control field based on the type of the control field.

Figure 12:
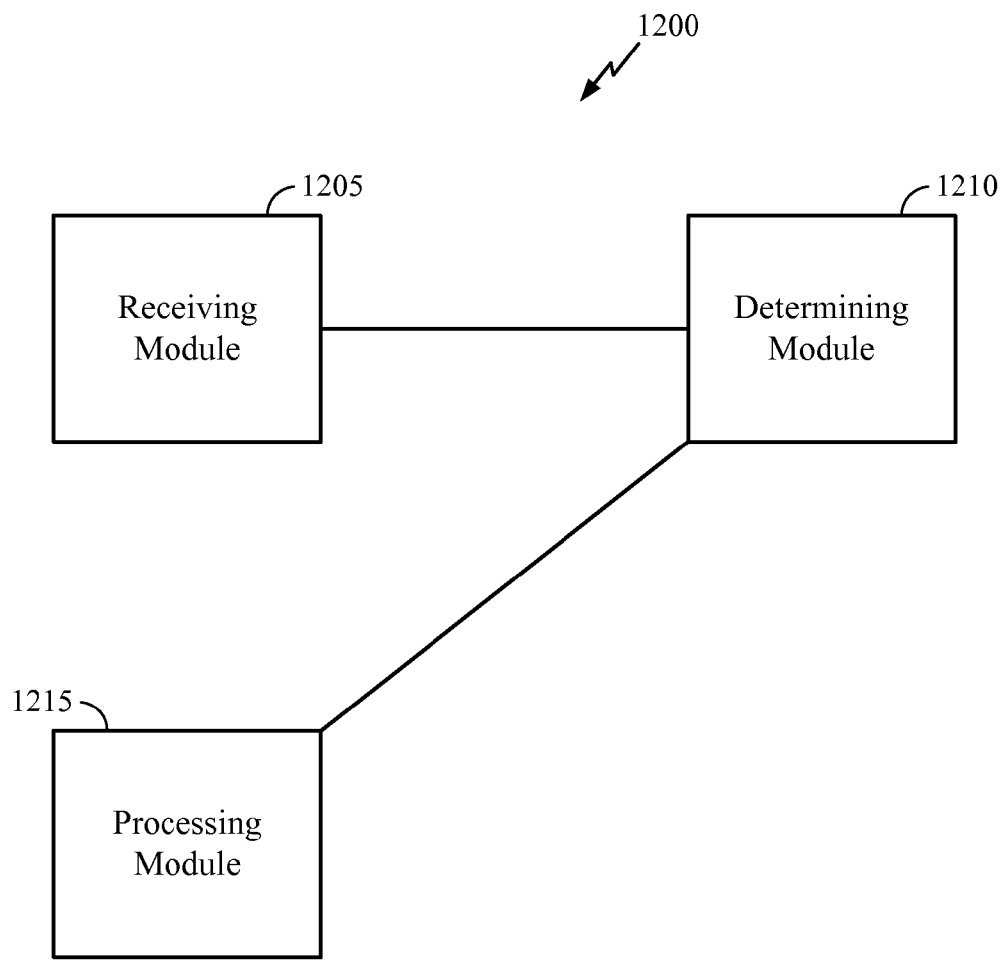
FIG. 12 illustrates a block diagram of an example user terminal in accordance with certain aspects of the present disclosure.

FIG. 12 illustrates a block diagram of an example user terminal 1200 in accordance with certain aspects of the present disclosure. User terminal 1200 comprises a receiving module 1205 which may be configured to perform the functions of the means for receiving discussed above. In some aspects, the receiving module may correspond to one or more of the receivers 254 of FIG. 2. User terminal 1200 further comprises a determining module 1210 which may be configured to perform the functions of the means for determining discussed above. In some aspects, the determining module may correspond to the controller 280 of FIG. 2. User terminal 1200 further comprises a processing module 1215 which may be configured to perform the functions of the means for processing discussed above. In some aspects, the processing module may correspond to the controller 280 of FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising:
   receiving a data unit comprising a first indicator signifying whether a control field is present in the data unit;
   determining that the control field is present based on the first indicator;
   determining whether the control field is a first type of control field or a second type of control field based at least in part on a second indicator in the control field; and
   processing the control field based on the type of the control field.

2. The method of claim 1, wherein the second indicator is the first bit of the control field.

3. The method of claim 1, wherein the second indicator indicates whether the control field type is very high throughput (VHT) or high throughput (HT).

4. The method of claim 1, wherein the second indicator is a reserved bit in the control field.

5. The method of claim 1, wherein the first indicator is an order bit.

6. The method of claim 5, wherein the order bit is included in a MAC header in the data unit.

7. The method of claim 6, wherein the order bit is included in a frame control field of the MAC header.

8. The method of claim 6, wherein the control field comprises an HT control field in the MAC header.

9. The method of claim 1, wherein the data unit comprises a physical layer protocol data unit (PPDU).

10. The method of claim 1, further comprising determining a modulation coding scheme (MCS) based on the control field.

11. The method of claim 1, further comprising transmitting a request for MCS feedback, wherein the data unit is received in response to the request.

12. An apparatus for wireless communication, comprising:
    a receiver configured to receive a data unit comprising a first indicator signifying whether a control field is present in the data unit; and
    a processing system configured to:
      if the first indicator signifies that the control field is present, determine whether the control field is a first type of control field or a second type of control field based at least in part on a second indicator in the control field; and
      process the control field based on the type of the control field.

13. The apparatus of claim 12, wherein the second indicator is the first bit of the control field.

14. The apparatus of claim 12, wherein the second indicator indicates whether the control field type is very high throughput (VHT) or high throughput (HT).

15. The apparatus of claim 12, wherein the second indicator is a reserved bit in the control field.

16. The apparatus of claim 12, wherein the first indicator is an order bit.

17. The apparatus of claim 16, wherein the order bit is included in a MAC header in the data unit.

18. The apparatus of claim 17, wherein the order bit is included in a frame control field of the MAC header.

19. The apparatus of claim 17, wherein the control field comprises an HT control field in the MAC header.

20. The apparatus of claim 12, wherein the data unit comprises a physical layer protocol data unit (PPDU).

21. The apparatus of claim 12, wherein the processing system is further configured to determine a modulation coding scheme (MCS) based on the control field.

22. The apparatus of claim 12, further comprising a transmitter configured to transmit a request for MCS feedback, wherein the data unit is received in response to the request.

23. An apparatus for wireless communication, comprising:
    means for receiving a data unit comprising a first indicator signifying whether a control field is present in the data unit;
    means for determining, if the first indicator signifies that the control field is present, whether the control field is a first type of control field or a second type of control field based at least in part on a second indicator in the control field; and
    means for processing the control field based on the type of the control field.

24. The apparatus of claim 23, wherein the second indicator is the first bit of the control field.

25. The apparatus of claim 23, wherein the second indicator indicates whether the control field type is very high throughput (VHT) or high throughput (HT).

26. The apparatus of claim 23, wherein the second indicator is a reserved bit in the control field.

27. The apparatus of claim 23, wherein the first indicator is an order bit.

28. The apparatus of claim 27, wherein the order bit is included in a MAC header in the data unit.

29. The apparatus of claim 28, wherein the order bit is included in a frame control field of the MAC header.

30. The apparatus of claim 28, wherein the control field comprises an HT control field in the MAC header.

31. The apparatus of claim 23, wherein the data unit comprises a physical layer protocol data unit (PPDU).

32. The apparatus of claim 23, further comprising means for determining a modulation coding scheme (MCS) based on the control field.

33. The apparatus of claim 23, further comprising means for transmitting a request for MCS feedback, wherein the data unit is received in response to the request.

34. A non-transitory computer readable medium comprising instructions that when executed cause an apparatus to:
receive a data unit comprising a first indicator signifying whether a control field is present in the data unit;
if the first indicator signifies that the control field is present, determine whether the control field is a first type of control field or a second type of control field based at least in part on a second indicator in the control field; and
process the control field based on the type of the control field.

35. A user terminal, comprising:
at least one antenna;
a receiver configured to receive, via the antenna, a data unit comprising a first indicator signifying whether a control field is present in the data unit; and
a processing system configured to:
if the first indicator signifies that the control field is present, determine whether the control field is a first type of control field or a second type of control field based at least in part on a second indicator in the control field; and
process the control field based on the type of the control field.

* * * * *